United States Patent [19]

Moder et al.

[11] Patent Number: 5,215,774
[45] Date of Patent: Jun. 1, 1993

[54] SELF-TOPPING CAKE

[75] Inventors: Gregg J. Moder, Minneapolis; William A. Atwell, Andover; Julio R. Panama, Blaine; Betty L. Brooking, Minneapolis; Carol J. Lenander, Brooklyn Park; Elayne C. Winkel, Minneapolis, all of Minn.

[73] Assignee: The Pillsbury Company, Minneapolis, Minn.

[21] Appl. No.: 463,727

[22] Filed: Jan. 12, 1990

Related U.S. Application Data

[63] Continuation of Ser. No. 249,259, Sep. 21, 1988, abandoned, which is a continuation of Ser. No. 110,469, Oct. 20, 1987, abandoned.

[51] Int. Cl.$^5$ .............................................. A21D 10/04
[52] U.S. Cl. ..................................... 426/243; 426/94; 426/549; 426/551; 426/552; 426/553; 426/554
[58] Field of Search ................... 426/94, 95, 243, 549, 426/551, 552, 553, 554

[56] References Cited

U.S. PATENT DOCUMENTS 3,899,601  8/1975  Johannes ............................. 426/554
4,396,635  8/1983  Raudebush et al. ............ 426/554 X Primary Examiner—Joseph Golian
Attorney, Agent, or Firm—William J. Connors

[57] ABSTRACT

A mix for making a cake having at least two distinct layers in a microwave oven. The mix is formulated to form an unleavened topping and a leavened cake layer. The viscosity of the batter for the cake layer is adjusted relative to the viscosity of the batter for the topping layer so that a cake having two distinct layers is formed by baking the batters in a microwave oven.

8 Claims, 12 Drawing Sheets

SELF-TOPPING CAKE

This is a continuation, of application Ser. No. 07/249,259 filed Sep. 21, 1988 and now abandoned, which is a continuation of application Ser. No. 07/110,469, filed Oct. 20, 1987 and now abandoned.

FIELD OF THE INVENTION

The present invention relates to a mix or batter for preparing a self-topping cake that can be baked in a microwave oven.

BACKGROUND OF THE INVENTION

The use of prepared mixes and batters has greatly simplified the task of preparing baked goods, in particular, cakes which contain flour, sugar, shortening, leavening agents, and other minor ingredients. To prepare cakes for use, the liquid ingredients such as oil, water, milk, and or eggs are added to the mix and stirred to form a homogeneous batter. This batter is subsequently baked to produce a final layer. Alternatively, the dry and liquid components can be assembled to make a batter prior to delivery to the consumer to further simplify the task of preparing baked goods. The use of such mixes and batters avoids the problems of assembling the various ingredients, measuring the desired quantities, and mixing them in the specified proportions.

The use of microwave ovens for baking has greatly simplified the baking process by reducing the time required for baking. Additionally, the baked goods can often be baked in a container that can be used for serving the product.

In a conventional oven, the process of cooking to the center of the food mass by conduction requires a temperature gradient, in which the surface temperatures are usually much higher than the final cooked temperature of the food. For example, a gas-fired oven may be maintained at 300°–400° F. to produce a baked cake layer. Under these conditions, browning of the surface of the cake layer is readily obtained. In microwave cooking, on the other hand, the ambient temperature in the cooking space is approximately room temperature. Any rise in temperature in this space is due to heat loss from the food to its environment. In a microwave oven, alternating electromagnetic fields are generated by a magnetron oscillating at a frequency of approximately 2450 megahertz. Some of the incident energy of electromagnetic waves, which are called microwaves at this frequency, is immediately absorbed within the food mass. The resulting increase in thermal energy (heat) in the food depends on an interaction between the microwave energy and the materials or components of which the food is composed. The dielectric properties (e', the relative dielectric constant and e", the relative dielectric loss factor) described how these components interact with the microwave field. This interaction occurs throughout the food mass, instantly produces heat, and results in rapid cooking.

Normally, food is cooked in utensils which are not very absorptive of microwave energy. Economy of energy is inherent in the microwave method compared with conventional ovens, in which the temperature of the environment is raised, in order to heat and cook through the mass of food by conduction and/or convection. However, this economy of energy has important consequences which affect the acceptance of foods cooked by the microwave method. The food habits of consumers heretofore have required that the food surface have certain familiar characteristics. The normal charred appearance of steak, the deep brown color of roast beef, and the golden brown color of pie crust are notable examples.

It has thus been found that foods cooked by microwaves may have somewhat different characteristics from foods cooked in a conventional oven, and it may be possible to take advantage of these differences in preparing foods in a microwave oven.

When a cake system, for example, a slab, toroid, or other shape, is placed in a microwave field, certain regions of the product heat more than others. In a standard layer cake, largely, this is due to a geometry effect whereby the edges are irradiated from three sides and the center receives energy primarily from only two sides. Another reason for the uneven delivery of microwave energy to products includes the presence of "hot spots" that are specific to individual microwave ovens. These are caused by microwave radiation interference patterns occurring due to the geometry of the oven cavity. Still another cause of uneven delivery of energy within a cake system, whether of one or more layers, is due to the variation in energy absorption with the thickness and dielectric characteristics of each layer. This has been described more fully in Ser. No. 903,007 and the CIP Ser. No. 085,125, filed Aug. 13, 1987, Atwell et al., for Microwave Food Product and Method, which applications are incorporated herein by reference.

The uneven heating resulting from this uneven energy distribution causes convection currents to occur in many fluid systems such as cake batters. Generally, in a standard size layer cake system, there is an upward flow at the edges and a downward flow in the center during microwave preparation. Random flow of batter due to microwave interference patterns or uneven delivery of energy within a layer can also occur. This turbulent flow can cause disruption of layer integrity in a multi-layer microwave cake system. Integrity is defined as having distinct boundaries between the layers and having layer thickness which boundaries and thickness remain substantially unchanged during the cooking process.

Microwave cake viscosity has been evaluated with microwave preparation time, and it has been determined that some portions of the batter set fairly early in the baking process. Lumps or discrete regions of set batter are apparent around the edges of the microwave cake batter after approximately 1–2 minutes at high power in a 700 watt microwave oven. A clear relationship between viscosity and temperatures has not been identified for temperatures above 50° C. due to this setting phenomenon and the corresponding high viscosities. It can be concluded from these observations that the turbulent flow contributing to a loss of layer integrity in a multicomponent batter system is confined to pre-setting viscosities and is probably largely occurring in the initial stages of the baking process.

White Wings markets a microwave cake/glaze mix in Australia. However, in this product the glaze or topping is very fluid after baking and removal from the pan, does not remain in position, and does not remain as a separate, integral layer after baking. The package provides no separate formulations for the cake or glaze components.

SUMMARY OF THE INVENTION

It is an object of the present invention to overcome at least some of the aforementioned deficiencies in the prior art.

It is a further object of the present invention to provide mixes or batters for preparing a cake in a microwave oven.

It is yet another object of the present invention to provide mixes or batters for preparing a self-topping cake in a microwave oven.

It is yet a further object of the present invention to provide a self topping cake where a distinctly separate and uniform topping layer is baked concomitantly with a high volume cake layer.

A high quality self topping cake which is baked in a microwave oven is provided by controlling the layer integrity and volume by defining batter viscosity limits for the adjacent layers.

Self-topping cakes can be baked from batters comprising a high-sugar substantially unleavened topping layer and a microwave leavened cake batter layer. The initial viscosity of the cake batter can range from about 200 poise to about 700 poise, and the initial viscosity of the unbaked topping layer can vary from about 200 poise to about 800 poise.

In the present invention, the topping and cake layers prior to baking have sufficient viscosity to maintain their integrity before and during baking.

The properties of the topping layer are such that the topping layer preferentially adheres to the cake layer rather than to the pan in which the cake is baked. This easy release of the topping from the pan is because of the hydrophilic nature of the topping and the hydrophobic nature of the pan. The final product is integral because both the cooked topping layer and the cooked cake layer are hydrophilic.

DETAILED DESCRIPTION OF THE INVENTION

Viscosity of both the cake batter and topping mixture was measured using a Rheometrics Fluid Spectrometer, Model RFS 8400, manufactured by Rheometrics, Inc. This is an oscillatory procedure that provides little shear to the batter during measurement. Viscosity measurements were taken at approximately 25° and 50° C. (the temperatures of the product just prior to cooking and the approximate product set temperature respectively) and were reported in poise. Parameters constant for the Rheometric measurements were as follows:

test = oscillatory dynamic;
mode = time;
geometry = parallel plate;
gap = 2 mm;
radius = 25 mm;
sweep = 28 minutes (total time) every 0.5 minutes (frequency of measurement;
frequency = 10 radians/sec;
strain = 10%.

Layer integrity of the topping layer was quantitated by measuring the standard deviation of 12 equidistant measurements of topping layer thicknesses (mm) across the diameter of the cake. Perfect layer integrity would have a score of zero. Cake height was measured in millimeters. Since the cake pans, and subsequently the cakes, are a constant diameter, height is directly related to volume.

Sensory measurements (acceptability, 0% to 100%) were made by eight trained panelists on the cakes. Categories included topping evenness (visual integrity), cake height, and total appearance.

Density measurements were made using a Beckman Model 930 Air Comparison Pycnometer and were recorded in units of g/cc.

A clear relationship between viscosity and temperature was not identified for temperatures above about 50° C. due to the setting phenomenon of the batter. The turbulent flow contributing to loss of layer integrity in a multicomponent batter system appears to be confined to pre-setting viscosities and is probably largely occurring in the initial stages of the bake.

Figure 1:
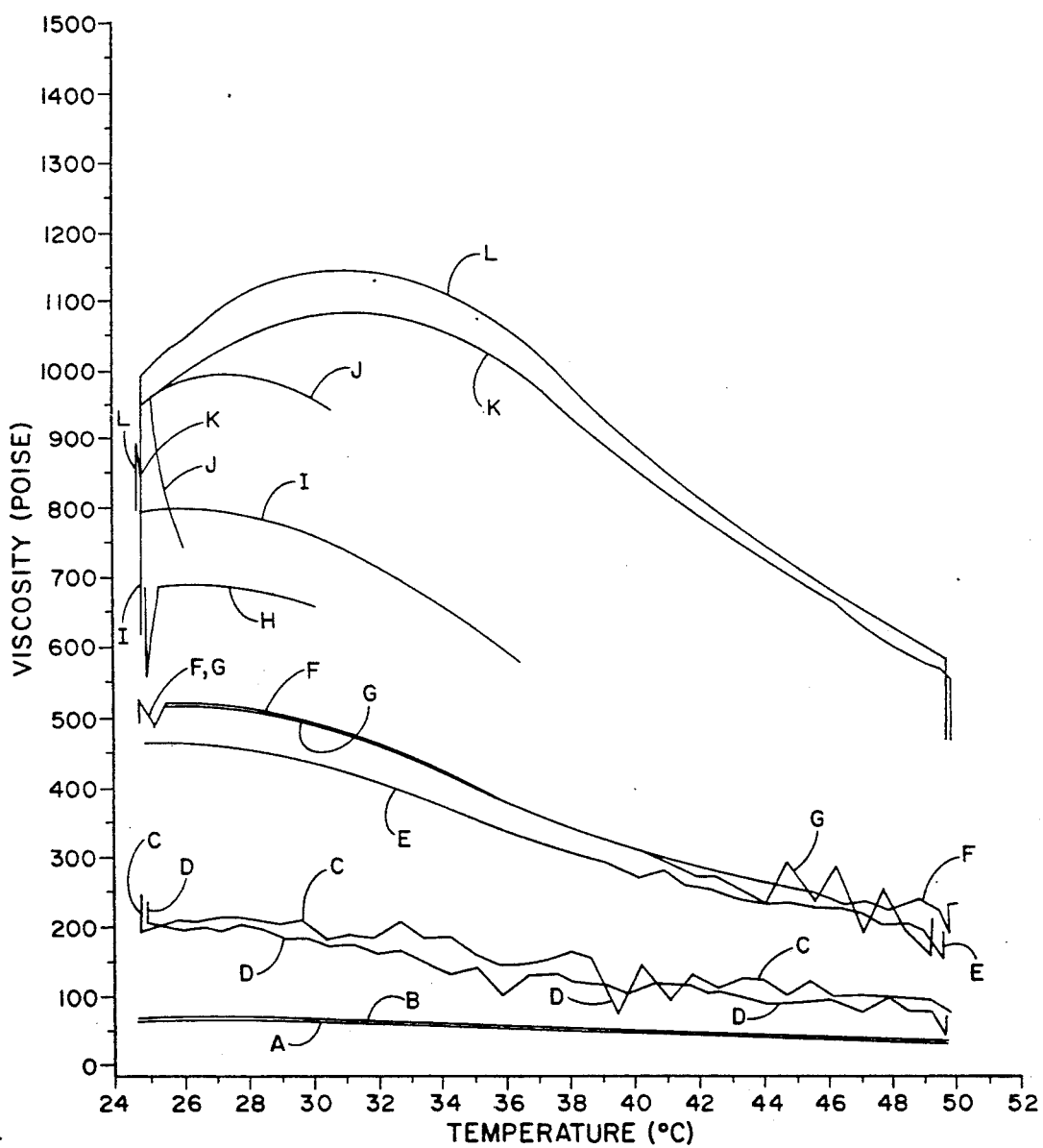
FIG. 1 shows viscosity versus temperature for various cake batter systems.
Figure 2:
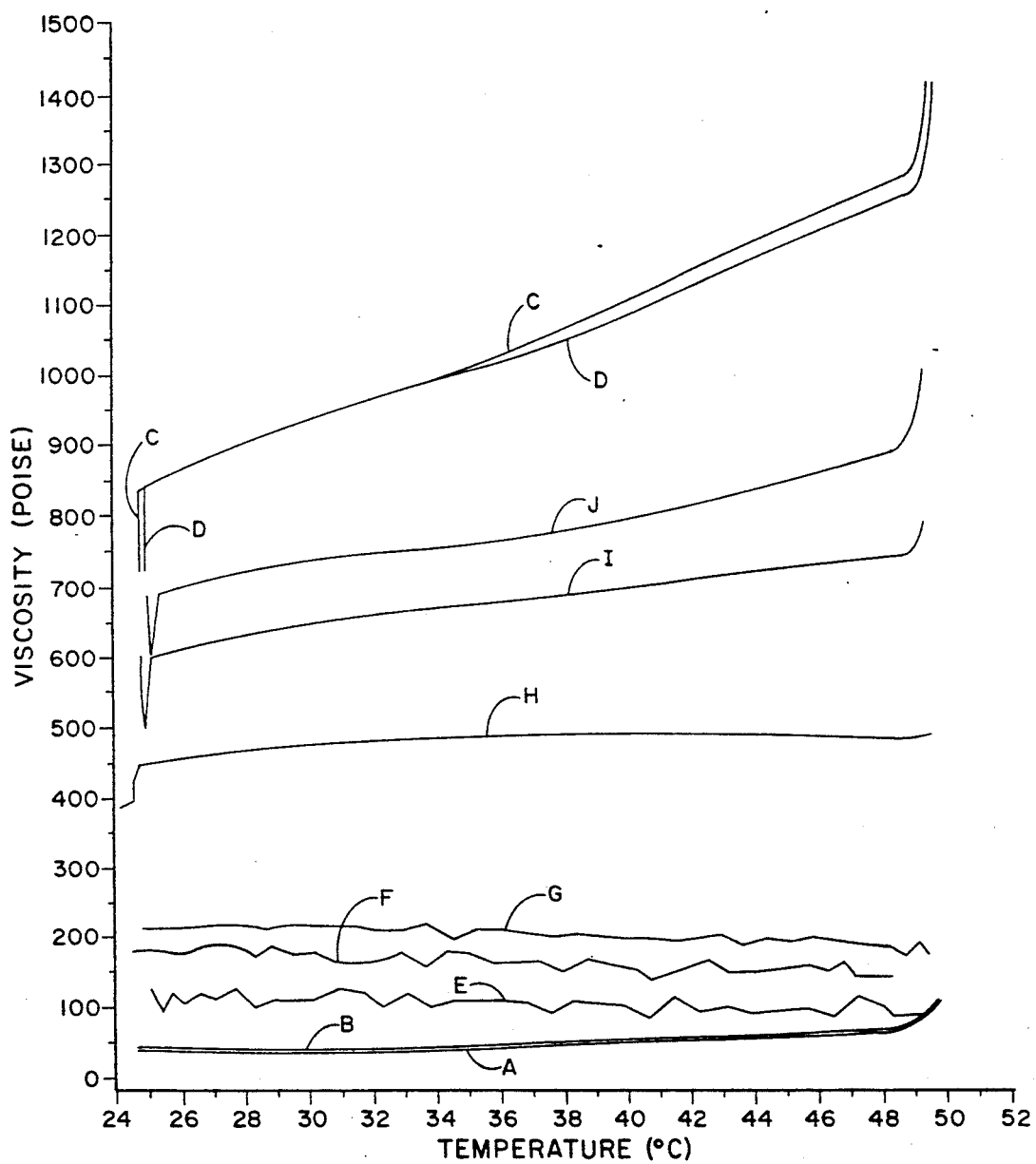
FIG. 2 shows viscosity versus temperature for various topping batter systems.

Viscosity versus temperature curves were obtained using the Rheometrics Fluid Spectrometer for temperatures between 25° C. and 50° C. FIG. 1 shows cake viscosities versus temperature for various cake systems within this temperature range. It can be observed that batters that initially have high viscosity (1000 poise) rise somewhat to a higher viscosity, and then fall dramatically as the temperature rises. All other batters represent systems where the viscosity falls through this temperature range. The lower the initial viscosity, the less dramatic the drop in viscosity through this temperature range. FIG. 2 shows the viscosity behavior of various toppings through the same temperature range. The topping viscosity for the present invention at least initially rises or remains constant with increased temperature.

The differences in viscosity behavior with temperature between the topping batter and cake batter is probably due to their formulation. The cake mix generally includes flour and sugar in approximately a 1:1 ratio, whereas the topping can be formulated without flour.

For the purposes of determining the viscosity ranges that might yield acceptable final baked layer integrity, 25° C. measurements were chosen. The ranges shown in FIGS. 1 and 2 (approximately 100 poise to 1000 poise) were chosen as the limits for the batters evaluated, because microwave cakes baked from batter having initial viscosities outside this range were considered to be unacceptable. It was important to consider cake volume as well as layer integrity, since a very low volume could cause a cake to be unacceptable regardless of integrity considerations. Within the viscosity limits chosen, volume varied dramatically.

Topping mixtures and cake batters were evaluated for density as well as initial viscosity immediately after mixing and at 25° C. Throughout the samples corresponding to the batter and topping viscosities described above, the density varied from 1.09 gram/cc to 1.28 gram/cc. Since it was very difficult to separate density and viscosity as independent variables, viscosity was chosen as the primary variable for study and density was allowed to float within this range.

Figure 3:
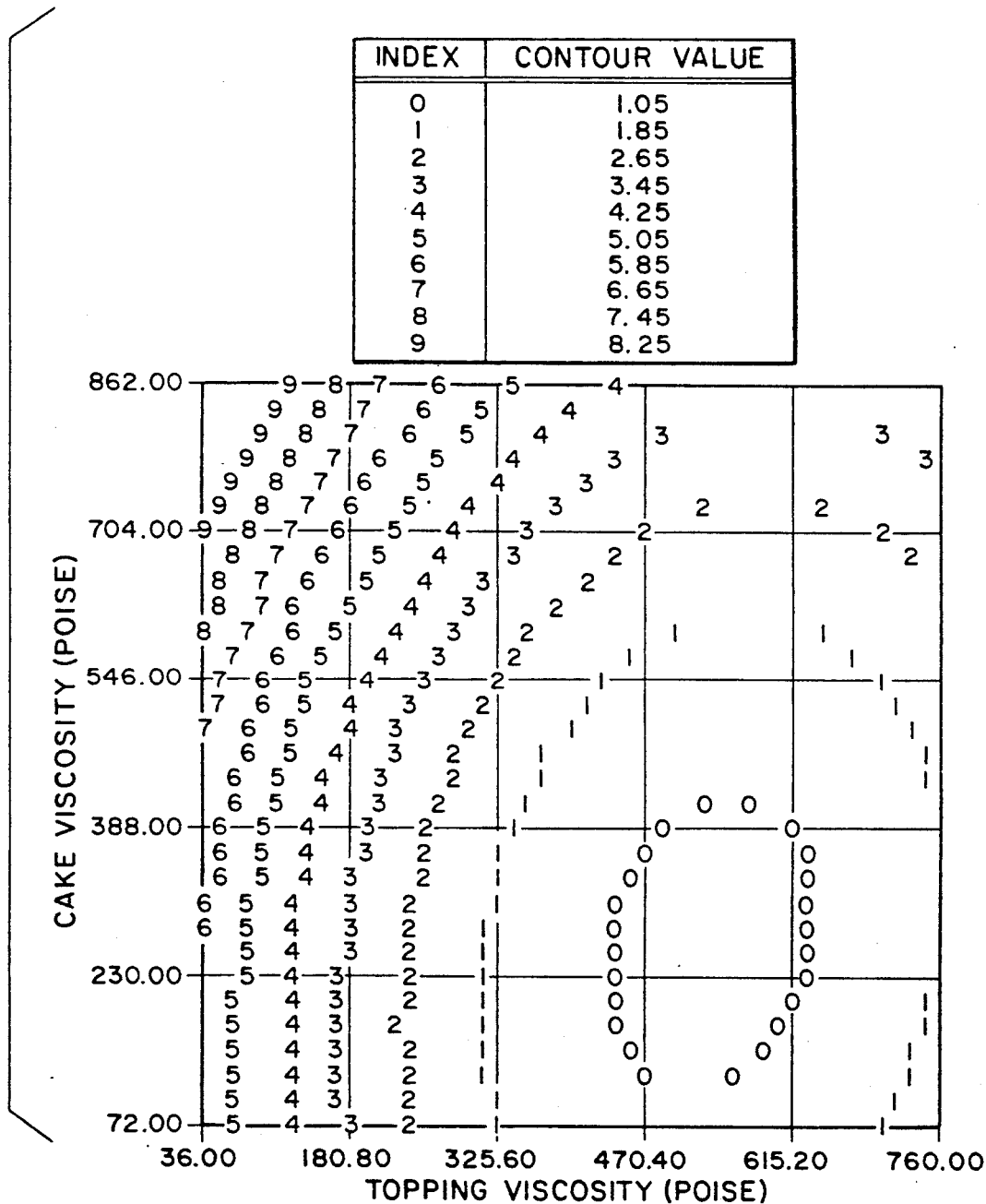
FIG. 3 shows the response surface plot of integrity as a function of topping viscosity and cake viscosity.
Figure 4:
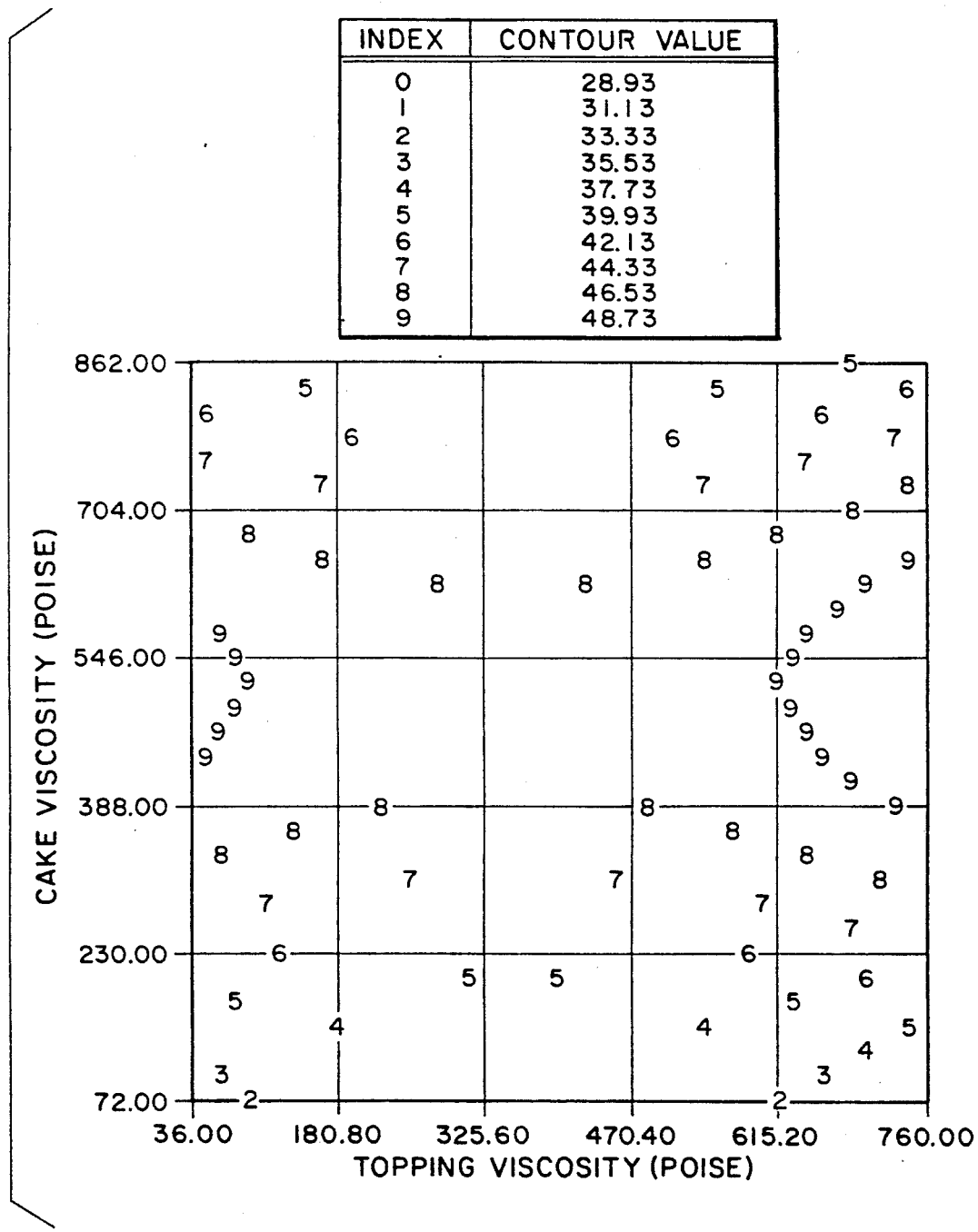
FIG. 4 shows the response surface plot of height as a function of topping viscosity and cake viscosity.

The cakes were microwave baked with topping mixture and cake batters varying between the viscosity limits in a variety of combinations. The cakes were evaluated for integrity, sensor perception, and volume. Statistical evaluation of the data collected yielded a number of response surface plots. FIG. 3 shows the relationship between the primary variables, (cake viscosity and topping viscosity) and the response layer integrity. It can be observed that layer integrity values are lowest at high topping viscosities and low cake viscosities. FIG. 4 shows a similar plot of the primary variables with height (volume) as the response. The topping viscosity appears to have little to do with cake volume. It is also evident that volume goes through an optimum with respect to cake viscosity at about 500 poise. The changes in density did not appear to confound the significance of these results.

The difference in viscosity behavior with temperature (compare FIGS. 1 and 2) between the topping mixture and cake batter is probably due to the formulation of the cake batter and topping. The cake mix used represents a fairly typical formula with about a 1:1 ratio of flour to sugar, so that viscosity is largely dependent upon the behavior of the flour component. The topping mixture can be formulated without flour, and can contain finely comminuted materials. The viscosity of the topping layer is primarily attributable to the sugar, pregelatinized starch, and any cocoa in the topping formula. The viscosities that result from the use of these ingredients are more stable with temperature.

Figure 5:
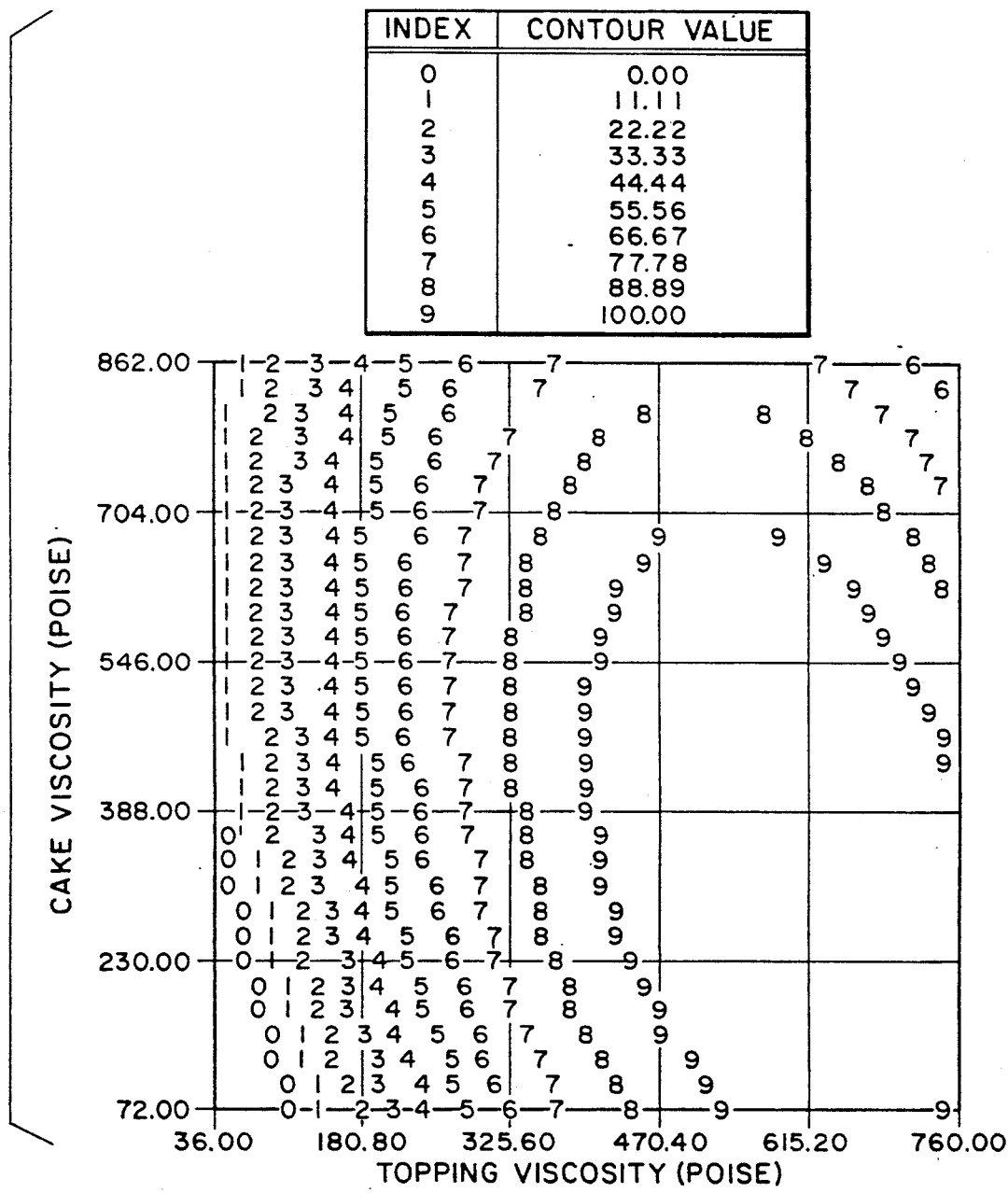
FIG. 5 shows the response surface plot of sensory integrity as a function of topping viscosity and cake viscosity.
Figure 6:
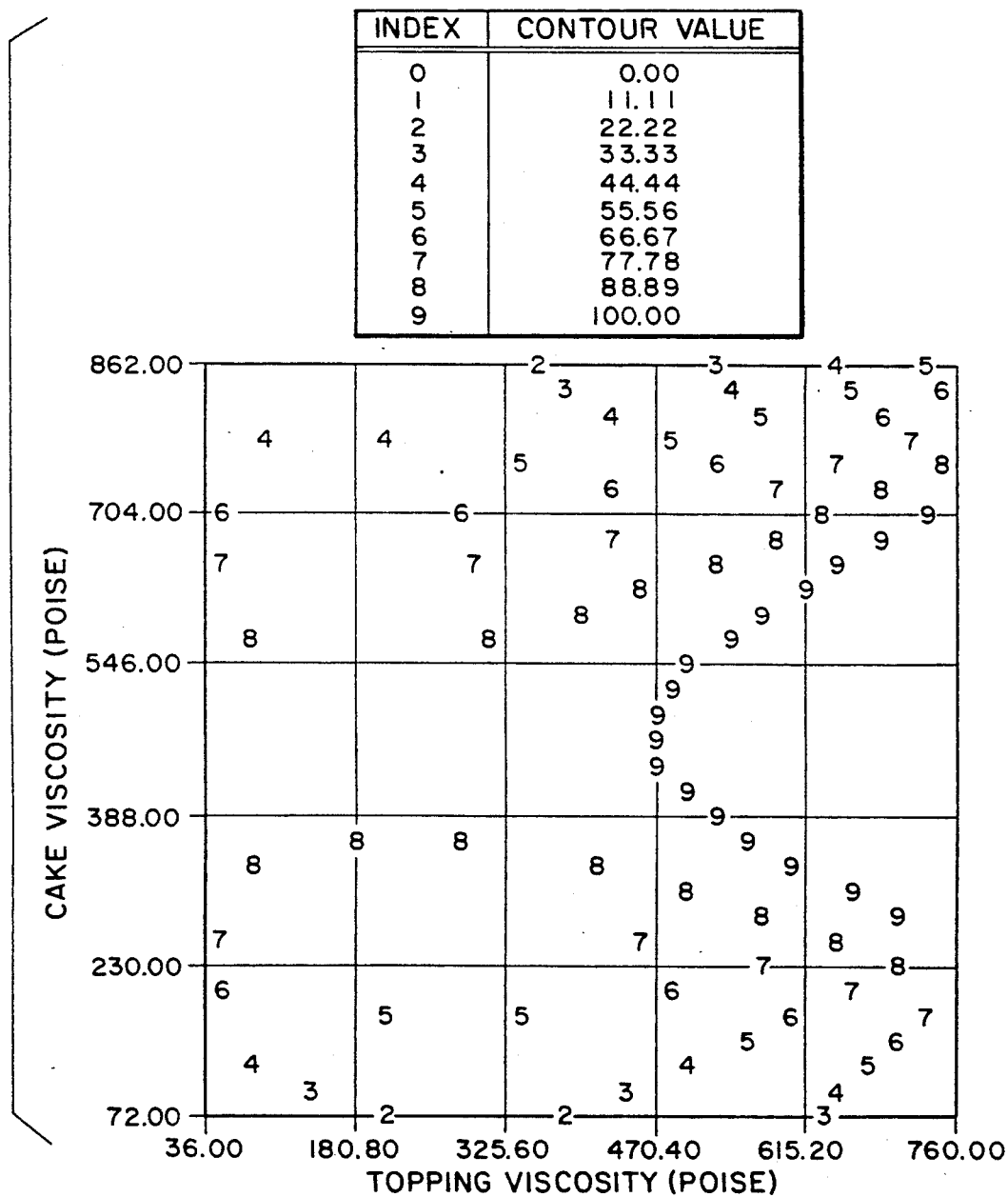
FIG. 6 shows the response surface plot of sensory height as a function of topping viscosity and cake viscosity.
Figure 7:
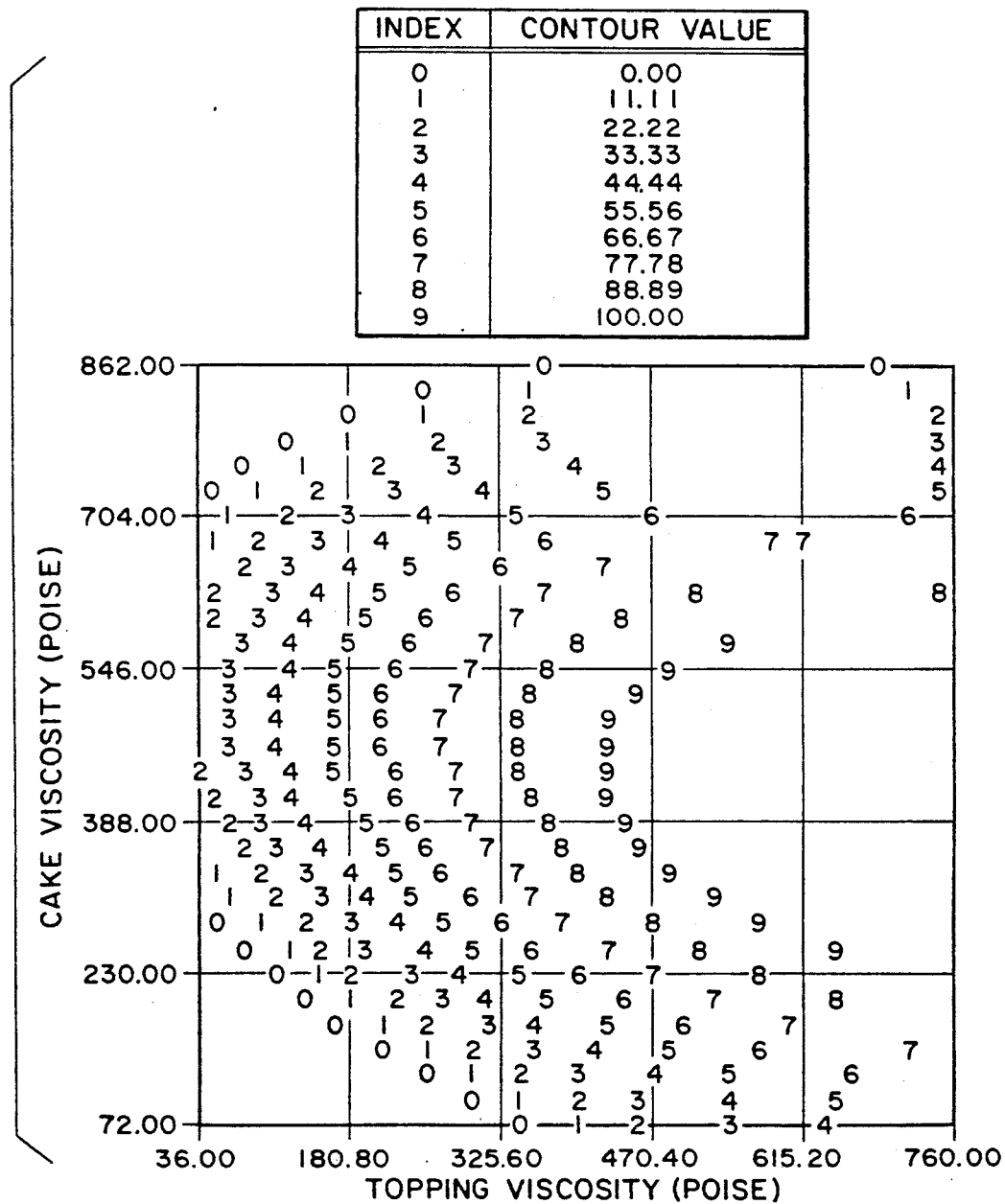
FIG. 7 shows the response surface plot of overall sensory appearance as a function of topping viscosity and cake viscosity.

FIGS. 5, 6, and 7 relate the sensory responses of visual integrity, visual height (volume), and visual appearance to the primary variables. The visual integrity plot closely resembles the analytically determined layer integrity plot. The visual height plot indicates a greatest height around 500 poise viscosity, but does show some dependence on topping viscosity with higher topping viscosities enhancing volume. Visual appearance is best in a region about halfway between the cake viscosity limits and in the high region of topping viscosity.

Figure 8:
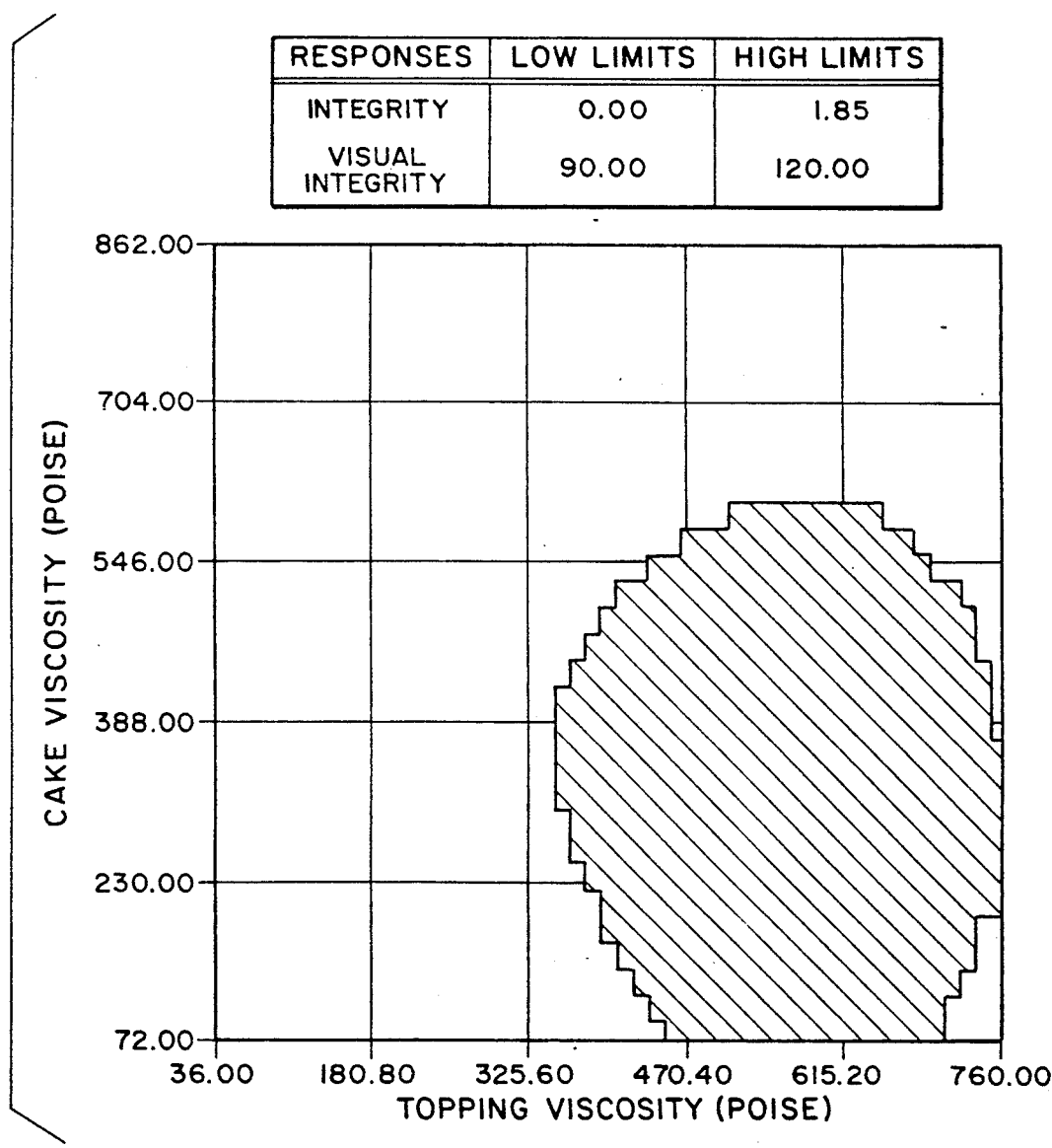
FIG. 8 shows the overlay plot of the integrity (limits 0 to 1.8 mm) and sensory integrity (above 90% acceptability) as functions of topping viscosity and cake viscosity.
Figure 9:
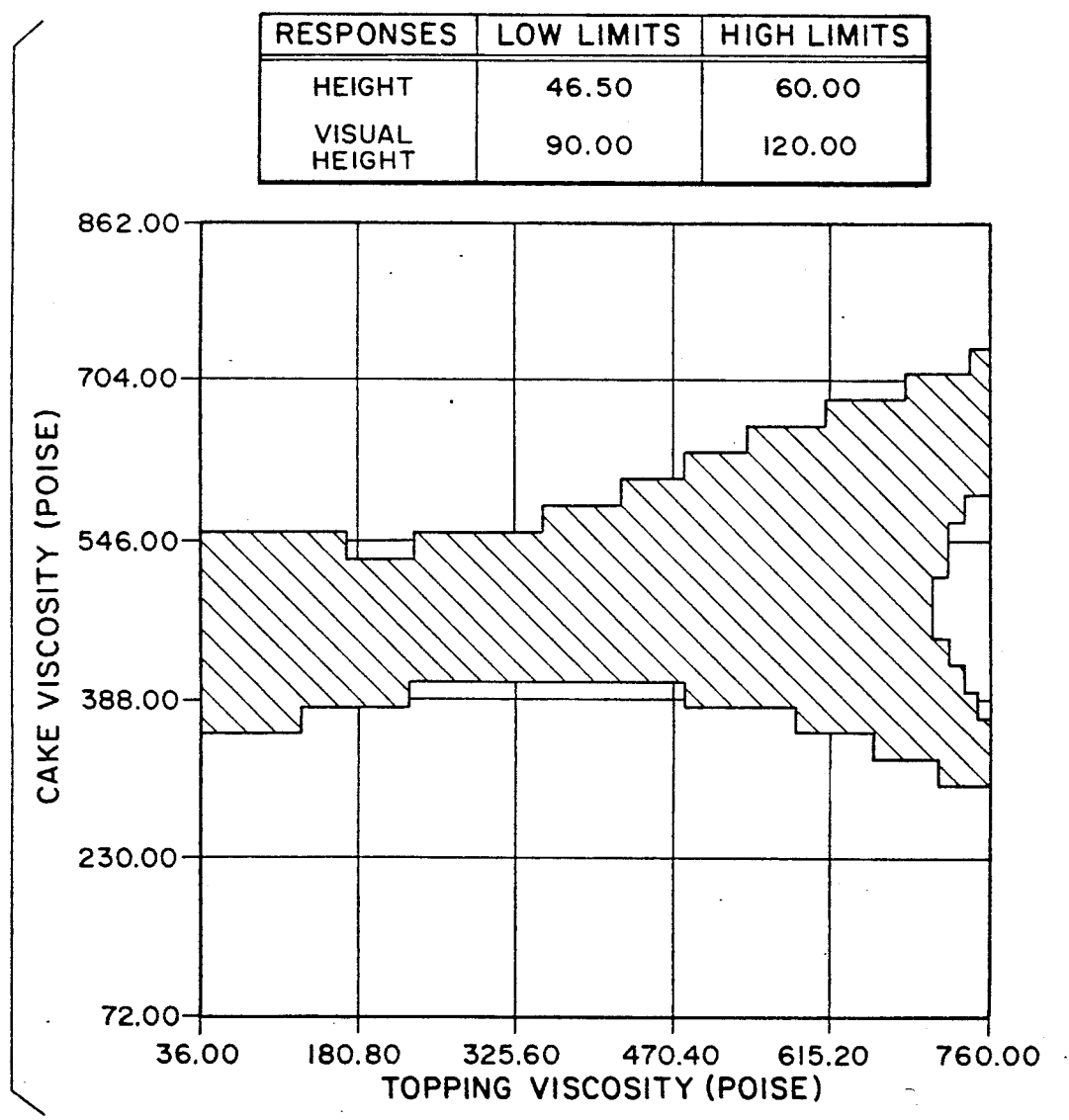
FIG. 9 shows the overlay plot of height (46.5 to 60.0 mm) and sensory height (above 90% acceptability) as functions of topping viscosity and cake viscosity.

Overlaying a region defined by layer integrity limits from 0 mm to 1.85 mm and a region defined by visual integrity limits about 90 percent acceptability yields a region that is common to both and is shown in FIG. 8. This area defines self topping cake systems that are acceptable for both analytical layer integrity and sensory visual integrity. FIG. 9 represents an area where analytically determined height was greater that 46.5 mm and sensor visual height was greater than 90 percent acceptability. This area defines self topping cake systems that are highest in volume.

Figure 10A:
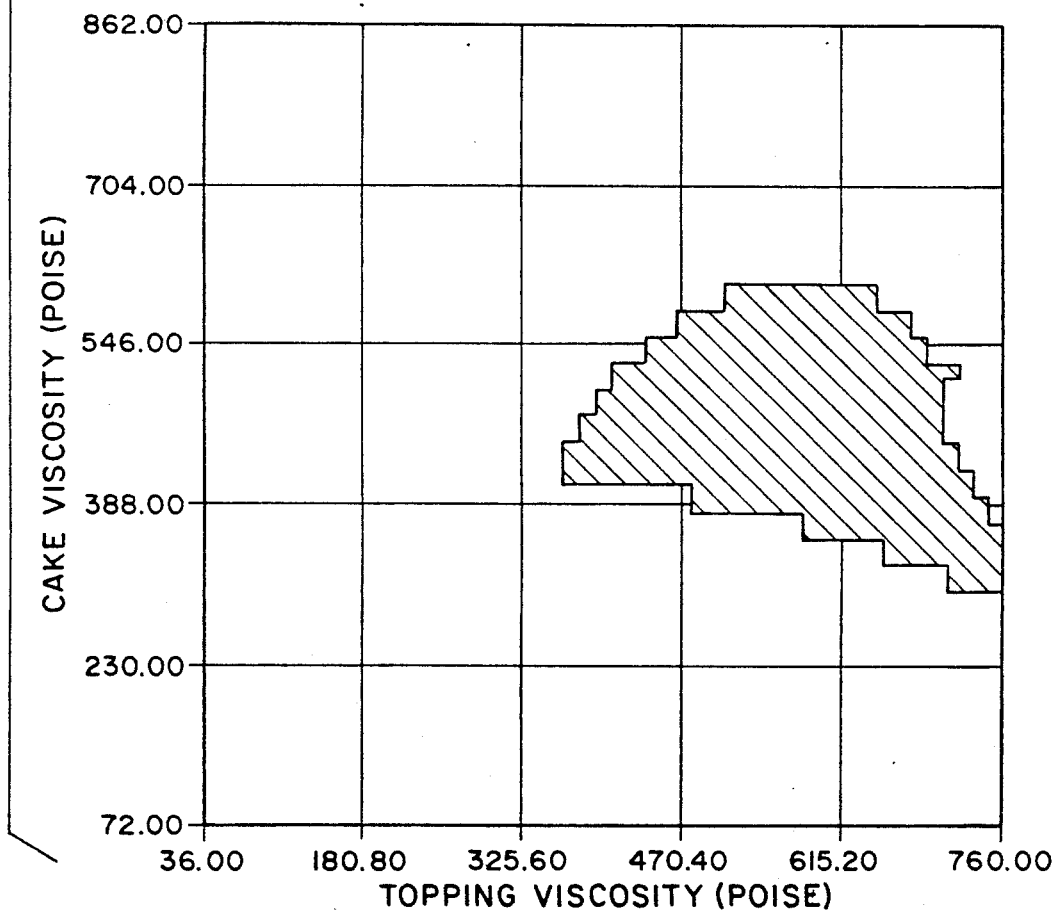
FIG. 10A shows the overlay plot of the integrity (limits 0 mm to 1.8 mm), sensory integrity (above 90% acceptability), height (46.5 mm to 60.0 mm), sensory height (above 90% acceptability), and overall sensory appearance (above 90% acceptability) as functions of topping viscosity and cake viscosity.
Figure 10B:
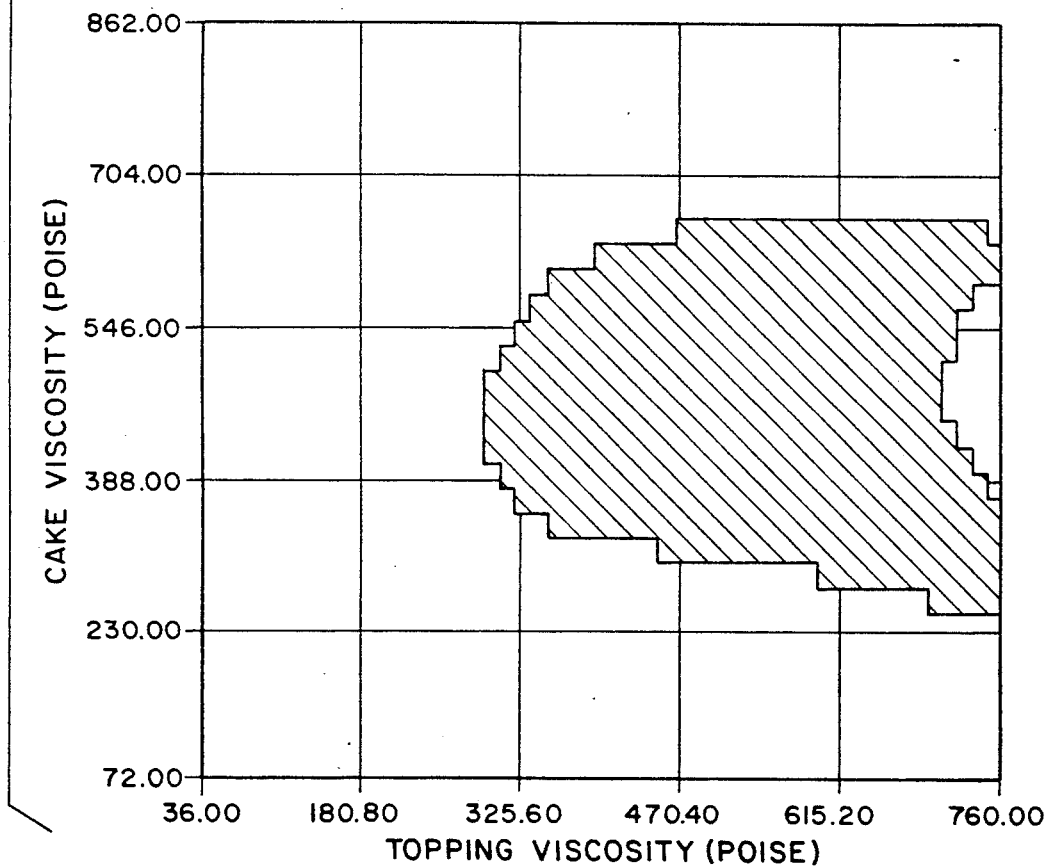
FIG. 10B shows the overlay plot of the integrity (limits 0 mm to 2.7), sensory height (44.3 mm to 60.0 mm), sensory integrity above 80% acceptability, sensory height above 80%, overall sensory appearance above 80%.
Figure 10C:
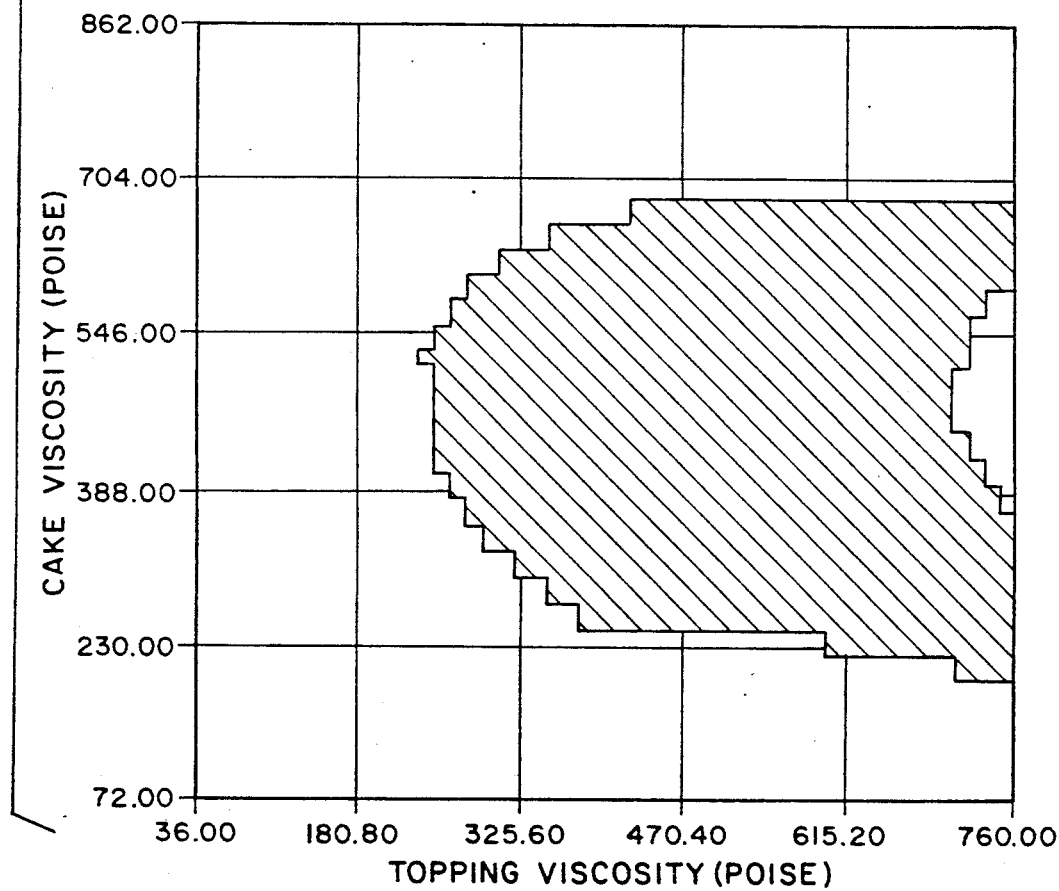
FIG. 10C shows the overlay plot of the integrity (limits 0 mm to 3.5 mm), height (42.1 mm to 60.0 mm), sensory integrity above 70%, sensory height above 70%, and overall sensory appearance above 70%.

The region shown in FIG. 10C defines the region that is common to both FIGS. 8 and 9, which shows self topping cakes that are acceptable for both the integrity and the volume responses.

FIG. 10B defines a similar relationship between cake batter viscosity and topping mixture viscosity, and FIG. 10A defines the most preferred relationship between cake batter viscosity and topping mixture viscosity.

As can be seen from these Figures, an acceptable product can be obtained wherein the viscosity of the batter ranges from about 200 poise to about 700 poise, and the topping viscosity ranges from about 200 poise to about 800 poise.

A better product is obtained when the batter viscosity ranges from about 250 poise to about 650 poise, and the topping viscosity ranges from about 275 poise to about 760 poise.

The best products are obtained when the cake viscosity ranges from about 275 poise to about 600 poise, and the topping viscosity ranges from about 330 poise to about 760 poise.

These viscosities were measured at 22° C. and prior to any substantial leavening.

All of the following examples were produced using the dry mix formulas for the topping and cake described below in Tables 1 and 2 Unless otherwise noted, all percentages are expressed as by weight.

The present invention can also be defined by the graphs shown in FIGS. 10A, 10B, and 10C.

TABLE 1

| Ingredient | Topping Mix Formula Percentage (as is basis) |
|---|---|
| Sucrose | 60.61 |
| Fructose | 6.46 |
| Gelatinized starch | 11.16 |
| Cocoa | 9.18 |
| Carob | 1.32 |
| Oil | 3.87 |
| Albumin | 2.58 |
| Nonfat dry milk | 1.94 |
| Salt | 0.75 |
| Vanilla | 1.24 |
| Monoglycerides | 0.32 |
| Red #40 Premix | 0.32 |
| Gum Blend | 0.13 |
| Titanium Dioxide | 0.12 |

It is preferred that the topping mixture be substantially unleavened, i.e., contains no leavening agents (except for water), and that the cake batter be a leavened batter. Leavened as defined herein means that the volume of the batter after cooking and cooling is at least 50% greater than the uncooked batter.

The topping mixture, after cooling, is substantially unleavened and nonporous. The density and volume of the topping mixture should not substantially change during or from cooking except for thermal expansion. It is preferred that the topping mixture, exclusive of any temporary thermal expansion, have a final volume after cooking and cooling of not more than 10%, and preferably less than 5%, greater than the original volume of the topping mixture. The topping mixture should also contain no more than a minimal amount of, and preferably no, flour or other source of gluten.

TABLE 2

Cake Mix Formula

| Ingredient | Percentage (as is basis) |
| --- | --- |
| Sucrose | 38.58 |
| Flour | 34.32 |
| Hydrogenated oil | 6.24 |
| Hydrolyzed cereal solids | 5.10 |
| Vegetable shortening | 3.36 |
| Dextrose | 3.00 |
| Sodium silicoaluminate | 1.60 |
| Emulsifiers | 2.72 |
| Monocalcium phosphate | 1.14 |
| salt | 0.80 |
| Sodium bicarbonate | 0.72 |
| Flavors | 1.45 |
| Xanthan gum | 0.52 |
| Yellow #5 premix | 0.22 |
| Sodium Aluminum phosphate | 0.20 |
| Enrichment | 0.03 |

For the individual examples, the ingredient quantities described in Table 3 were added to a mixing bowl and beaten with a spoon about 75 strokes until well blended, breaking up any large lumps.

This process was conducted for the topping and for the cake in each example. Viscosity readings were taken as described above. The topping layer was added to the bottom of a greased microwave cake pan (as commercially available in Pillsbury Microwave Cake Mix starter kits) and the cake batter was carefully added above it so as not to disrupt the topping layer. The cakes were baked in a 700 watt microwave oven for 7 minutes on high power. Layer integrity, height, and sensory evaluations were performed on each cake as described above.

Table 3 shows the formulas for the cake batter and the topping.

TABLE 3

Topping and Cake Batter Formulas

| Example | Type | Mix | Weight (grams) Water | Oil | Egg |
| --- | --- | --- | --- | --- | --- |
| 1 | cake | 212.4 | 125.0 | 57.6 | 45.0 |
|   | topping | 137.5 | 52.5 | 60.0 | 0.0 |
| 2 | cake | 275.4 | 72.0 | 57.8 | 45.0 |
|   | topping | 82.5 | 107.5 | 60.0 | 0.0 |
| 3 | cake | 180.0 | 167.4 | 57.5 | 45.0 |
|   | topping | 107.5 | 82.5 | 60.0 | 0.0 |
| 4 | cake | 293.4 | 54.0 | 57.6 | 45.0 |
|   | topping | 107.5 | 82.5 | 60.0 | 0.0 |

Table 4 illustrates the relationship between the initial batter viscosities, layer integrity, and cake height.

TABLE 4

Example Results (Analytical Responses)

| Example | Cake Viscosity | Topping Viscosity | Integrity | Height |
| --- | --- | --- | --- | --- |
| 1 | 188 | 654 | 1.16 | 43.39 |
| 2 | 746 | 654 | 3.10 | 44.36 |
| 3 | 72 | 398 | 1.05 | 28.93 |
| 4 | 862 | 398 | 3.63 | 38.98 |

Table 5 illustrates the relationship between the initial batter viscosities and the sensory measurements

TABLE 5

Example Results (Sensory Responses)

| Example | Cake Viscosity | Topping Viscosity | Visual Integrity | Visual Height | Sensory Overall |
| --- | --- | --- | --- | --- | --- |
| 1 | 188 | 654 | 100.0 | 100.0 | 100.0 |
| 2 | 746 | 654 | 25.0 | 62.5 | 12.5 |
| 3 | 72 | 398 | 100.0 | 0.0 | 0.0 |
| 4 | 862 | 398 | 87.5 | 12.5 | 0.0 |

The results in Tables 4 and 5 clearly indicate that initial batter viscosities can be used to control the layer integrity, volume, and visual sensory quality of self topping cakes.

The use of topping (filling) viscosity and cake viscosity for controlling integrity can also be demonstrated in a system where the topping layer is immersed or suspended in the cake layer. Examples 5, 6, and 7 demonstrate this control in several conformations of cake and topping (filling). For these examples, the dry mix components for the topping are shown in Table 1 and the dry mix components for the cake are shown in Table 2. The percentages of the batter components for the cake and topping (filling) in examples 5, 6, and 7 are shown in Table 6. These two batter compositions were chosen because they represent batters with viscosities in the ranges defined in FIG. 10A.

It should be noted that, unless otherwise specified, all percentages are by weight.

TABLE 6

Example 5-7 Topping and Cake Batter Formulas

| Type | Percent of Batter | | | | Batter Viscosity |
| --- | --- | --- | --- | --- | --- |
|      | Mix | Water | Oil | Egg |  |
| cake | 55.2 | 22.0 | 12.8 | 10.0 | 460 |
| topping (filling) | 49.8 | 26.4 | 23.8 | 0.0 | 536 |

For example 5, one 150 gram, uniform layer was added to a Pillsbury Microwave cake pan and it was put in a freezer for one hour. After this time the layer had solidified and 150 grams of topping (filling) was put on top in a uniform layer. This was frozen and another 150 gram layer of cake batter was added in a uniform layer above the other two layers. The entire cake was allowed to thaw and it was microwave baked as described for the earlier examples.

For example 6, an 80 gram amount of topping (filling) was placed in the bottom of a Pillsbury Microwave cake pan in a conformation approximating a cylinder. This topping was frozen as described in example 5. After the topping had solidified, 370 grams of cake batter was added to the pan and the entire system was allowed to thaw. It was then microwave baked as described earlier. The integrity of the topping (filling) layer has been preserved.

For example 7, 150 grams of cake batter was placed in a uniform layer in a Pillsbury Microwave cake pan and frozen. An 80 gram quantity of topping (filling) was then added on the center of the top of the frozen cake batter in a conformation approximating a cylinder. After the topping (filling) was frozen, 320 grams of cake batter was added above the components added earlier. The entire system was allowed to thaw and the batter was microwave baked as described earlier. Again the integrity of the topping (filling) layer has been maintained.

The topping mix is primarily sugar-based, i.e., at least about 50% sugar, with pregelatinized starch added to provide consistent viscosity for layer integrity, and oil and flavorings for flavor. For preparation of the topping layer, liquid ingredients such as milk, water, and/or oil are added to the topping mix, the composite is mixed together, and gently poured into a microwave cake pan.

The cake mix is a dry mix to which water, milk, eggs, and/or oil are added to form a batter which can be baked in a microwave oven. The cake mix generally comprises from about 30% to about 50% sugar and 20%–40% wheat flour; from about 0.5% to about 5% of total leavening acids and bases; from about 5% to about 20% of shortening; from about 0.1% to about 2% emulsifier; and the balance being conventional cake additives. The term "conventional cake additives" includes ingredients such as flavors, thickeners, nutrients, antioxidants and antimicrobial agents, nonfat milk solids, egg solids, starches, and the like.

Suitable hydrophilic colloids can include natural gum material such as Xanthan gum, gum tragacanth, locust bean gum, algin, gelatin, Irish moss, pectin, and gum arabic. Synthetic gums such as water-soluble salts of carboxymethylcellulose can also be used.

Nonfat milk solids which can be used in the composition of the present invention are the solids of skim milk and include proteins, mineral matter, and milk sugar. Other proteins such as casein, sodium caseinate, calcium caseinate, modified casein, sweet dairy whey, modified whey, and whey protein concentrate can also be used herein.

Starches can also be added to the cake mix as well as to the topping formulation. Suitable starches include corn, waxy maize, wheat, rice, potato, tapioca, and rice starches.

For many mixes, it is accepted practice for the user to add the required amount of egg and oil in the course of preparation, and this practice may be followed just as well with the present mixes. If desired, however, the inclusion of egg solids, in particular egg albumin and dried yolk, in the mix are allowable alternatives. Soy isolates may also be used herein in place of the egg albumin.

Dry or liquid flavoring agents may be added to the batter mix and to the topping mix. These flavoring agents include cocoa, vanilla, chocolate, coconut, peppermint, pineapple, cherry, nuts, spices, salts, flavor enhancers, and the like. Any suitable flavoring agent used to prepare baked goods and their respective toppings may be used in the present invention. As used herein, baked foods includes cakes, cupcakes, and other types of baked goods which would ordinarily contain a leavening agent.

The ordinary granulated sugars are satisfactory for use both in the batter mix and in the topping mix. These include sucrose, dextrose, maltose, fructose, lactose, brown and invert sugars, alone or in combination. Artificial sweeteners can also be used herein, as can the sugar alcohols such as xylitol and mannitol.

The flour for use in the mix of the present invention can be the usual bleached cake flour, although a good general all-purpose flour can also be used. Flours which have been treated in other manners, to produce flours of the quality of bleached cake flour, are also acceptable. The flour can be enriched with additional vitamins and minerals.

To make the topping mixture and the cake mix, the ingredients can be mixed together in a conventional manner. Any batch-wise conventional system for preparing cake mixes can be used herein.

The leavening agent is selected to provide a tender and light cake with acceptable sensory attributes. The leavening comprises a baking soda such as sodium, potassium, or ammonium bicarbonate, and a baking acid, such as sodium aluminum phosphate (SALP), Sodium Acid Pyro-phosphate (SAPP) and monocalcium phosphate (MCP) or mixtures thereof.

The emulsifier may be selected from the group including lactylated mono- and di-glycerides, polyglycerol esters, sorbitan esters, diacetylated tartaric acid esters of mono- and di-glycerides, citric acid esters of monoglycerides, stearoyl-2-lactylates, polysorbates, succinylated monoglycerides, acetylated monoglycerides, ethoxylated monoglycerides, lecithin, sucrose monoester, and mixtures thereof.

The shortening suitable for use in the present invention can be plastic or fluid. However, a major part of the shortening is generally a liquid oil. The oil portion of the shortening can be derived from naturally occurring liquid triglyceride oil such as cottonseed oil, soybean oil, peanut oil, rapeseed oil, sesame oil, coconut oil, corn oil, and sunflower seed oil. Also suitable are liquid oil fractions obtained from palm oil, lard, and tallow, as, for example, by graining or directed interesterification followed by separation of the oil. Oils predominating in glycerides of unsaturated acids may require some hydrogenation to maintain flavor. Of course, mixtures of the above oils or other oils can also be used, as can solid fatty materials such as saturated triglyceride fats. Fish oils such as herring, menhaden, and whale oil can also be used herein.

A batter is prepared from the mix of the present invention by combining it with liquid ingredients such as water, milk, oil, and/or eggs either in home preparation from a mix or can be prepared commercially and sold ready to use at home in prepared form. The topping part of the cake is prepared by adding liquid ingredients such as water, milk, and/or oil. The cake batter comprises from about 42% to about 52% by weight of base dry mix ingredients, while the topping batter comprises from about 50% to about 65% by weight of base dry mix ingredients.

The topping is first poured into a cake pan, after which the cake batter is carefully poured onto the topping. One could also freeze the batters, for delivery of uniform layers and/or to distribute it commercially. The entire contents of the cake pan are then baked in a microwave oven.

Several bands of frequencies are available for microwave cooking. The frequencies range from about 915±25 to about 2450±50 megahertz. It is preferable to use microwave frequencies of about 2450±50 megahertz for the practice of the present invention.

The exact cooking time will depend upon the frequency of the microwave energy used, the composition of the batter as well as the amount of batter in the pan, the initial temperature of the batter and the geometry of the pan, among other factors.

All types of flavor and sugar-based prepared cake and topping mixes can be made in a microwave oven using the above combinations. Yellow cakes, chocolate cakes, devil's food cakes, marble cakes, spice cakes, pineapple cakes, and many other types of layer cakes of excellent quality can be prepared simply by adding liquid ingredients to the dry ingredients for the topping and for the batter. The flavor of the topping may be chosen to match or to complement the flavor of the batter.

Particularly satisfactory mixes for preparation of a cake layer according to the present invention are disclosed in Citti et al., U.S. Ser. No. 55,852, filed Jun. 1, 1987, for Microwave Cake Mix and Methods of Manufacture and now abandoned.

A preferred dry mix for preparing a lemon cake batter is as follows:

|  | % by weight |
|---|---|
| special sucrose | 23.1480 |
| powdered sucrose | 15.4320 |
| sugar entoleted |  |
| flour | 34.3200 |
| hydro. vegetable oil - | 6.2400 |
| hydrolyzed cereal solids | 5.1000 |
| powd. veg. shortening, | 3.3600 |
| dextrose | 3.0000 |
| sodium silicoaluminate | 1.6000 |
| pwd. PGME/mono/SSL | 1.2000 |
| monocalcium phosphate | 1.1400 |
| distilled mono and | 0.8000 |
| salt, filled fine | 0.8000 |
| salt, filled fine |  |
| bicarbonate of soda | 0.7200 |
| lemon juice flavor | 1.0000 |
| Xanthan gum | 0.52000 |
| vanilla flavor | 1.2000 |
| triglycerol | 0.4000 |
| NA stearoyl lactylate | 0.3200 |
| yellow sucrose premix | 0.2200 |
| (Tartrazine - FD&C yellow No. 5) |  |
| SALP (slow acting) | 0.2000 |
| enrichment (flour) | 0.0280 |
| TOTAL | 100.0000 |

The topping dry mix has the following formulation:

|  | % by weight |
|---|---|
| special sucrose | 44.1300 |
| powdered sucrose | 29.3700 |
| tapioca starch | 07.3400 |
| starch | 07.3400 |
| dextrose (coarse) | 04.6400 |
| vegetable oil | 03.9800 |
| distilled mono and | 00.8300 |
| albumen, | 00.6600 |
| lemon juice flavor | 00.9900 |
| salt, with or without | 00.2500 |
| salt, filled fine |  |
| tetrasodium pyrophos. | 00.1500 |
| calcium acetate | 00.1000 |
| yellow sucrose premix | 00.0700 |
| (tartrazine - FD&C yellow No. 5) |  |
| citric acid, | 00.1500 |
| TOTAL | 100.0000 |

To prepare the self-topping cake from a mix, first the topping mix is mixed with water, stirred until smooth, and spread evenly into a greased pan.

Next, the cake mix is mixed with water, oil and egg, stirred until well blended, and beaten with a spoon until well blended, breaking up any large lumps. The cake batter is spooned evenly over the topping mixture, and the cake is baked on high power for 7-9 minutes, depending on the wattage of the microwave oven. The cake and topping are then inverted and ready to serve. The cake may be topped with an optional glaze.

A formulation for a chocolate cake mix for the cake layer is as follows:

|  | % by weight |
|---|---|
| special sucrose | 21.1200 |
| powdered sucrose | 14.800 |
| granulated sucrose |  |
| sugar entoleted |  |
| flour | 25.9400 |
| dextrose (coarse) | 12.0800 |
| hydro. vegetable oil - | 7.8000 |
| powd. veg. shortening, | 4.0000 |
| cocoa, processed | 4.0000 |
| cocoa, processed | 4.0000 |
| sodium silicoaluminate | 1.6000 |
| bicarbonate of soda | 1.6000 |
| vanilla flavor | 1.2000 |
| salt, with or without | 0.8000 |
| salt, filled fine |  |
| monocalcium phosphate | 0.7600 |
| NA stearoyl lactylate | 0.4000 |
| Xanthan gum | 0.4000 |
| sod. alum. phos. (slow acting) | 0.2000 |
| enrichment (flour) | 0.0200 |
| TOTAL | 100.0000 |

A chocolate topping mix has the following formulation:

|  | % by weight |
|---|---|
| special sucrose | 36.3600 |
| powdered sucrose | 24.2500 |
| granular fructose | 06.4600 |
| tapioca starch | 05.5800 |
| starch | 05.5800 |
| cocoa, Dutch processed | 05.2500 |
| cocoa, natural process | 03.9300 |
| carob powder | 01.3200 |
| vegetable oil | 03.8700 |
| albumen, | 02.5800 |
| nonfat dry milk | 01.9400 |
| salt, with or without | 00.7500 |
| salt, filled fine |  |
| vanilla flavor | 01.2400 |
| distilled mono and |  |
| diglycerides | 00.3200 |
| red #40 sucrose premix | 00.3200 |
| gum blend | 00.1300 |
| titanium dioxide | 00.1200 |
| TOTAL | 100.0000 |

The cake plus topping is prepared and baked as for the yellow cake described supra. An optional glaze may be applied to the cake after removing the cake from the pan.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. A method for making a cake with topping by simultaneously baking cake batter and topping mixture in a microwave oven, said method comprising:

a. forming a leavened cake batter;

b. forming a substantially unleavened topping mixture which has a viscosity adjusted relative to the viscosity of the cake batter so that two distinct layers are formed when the cake batter and the topping mixture are baked using microwave energy;

c. placing said cake batter and said topping mixture into a cooking utensil; and d. exposing said cake batter and topping mixture to microwave energy and thereby baking said cake batter for a time sufficient to set the crumb structure of the cake batter and thereby form a cake with a topping portion and a cake portion.

2. The method according to claim 1 wherein the topping mixture has a viscosity prior to baking of from about 200 poise to about 800 poise and the viscosity of the cake batter prior to baking ranges from about 200 poise to about 700 poise.

3. The method according to claim 1 wherein said topping mixture is substantially free of fat.

4. The method according to claim 2 wherein said topping mixture includes a sufficient amount of starch to control the initial viscosity thereof.

5. The combination of a cake mix and a topping mix for use in preparing a self-topped cake to be baked using microwave energy, said cake mix comprising a ratio of flour to sugar of approximately 1:1 and said topping mix consisting essentially of sugar and starch, said cake mix and said topping mix being formulated so that when mixed with liquid said cake mix has a viscosity ranging from about 200 to 700 poise and said topping mix being formulated so that when mixed with liquid said topping mix has a viscosity ranging from about 200 to about 800 poise, said topping mix and said cake mix being such that after being mixed with liquid they have sufficient viscosity to maintain their integrity before and during baking with microwave energy.

6. The combination of claim 5 wherein said topping mix is at least about 50% sugar and pregelatinized starch is used to control the viscosity of the topping mix.

7. The combination of claim 5 wherein said cake mix comprises from about 30–50% by weight sugar, from about 20–40% by weight flour, from about 0.5 to about 5% by weight leavening agent, from about 5 to about 20% by weight shortening.

8. The combination of claim 7 wherein said topping comprises at least 50% sugar.

* * * * *